Dec. 15, 1964  D. A. CARGILL ETAL  3,161,145
SPRING CLUTCH FOR CONVEYOR PALLET

Filed Jan. 14, 1963  5 Sheets-Sheet 1

INVENTORS
DON A. CARGILL
LLOYD M. FORSTER
BY *Harley, Forster, & Harley*

ATTORNEYS

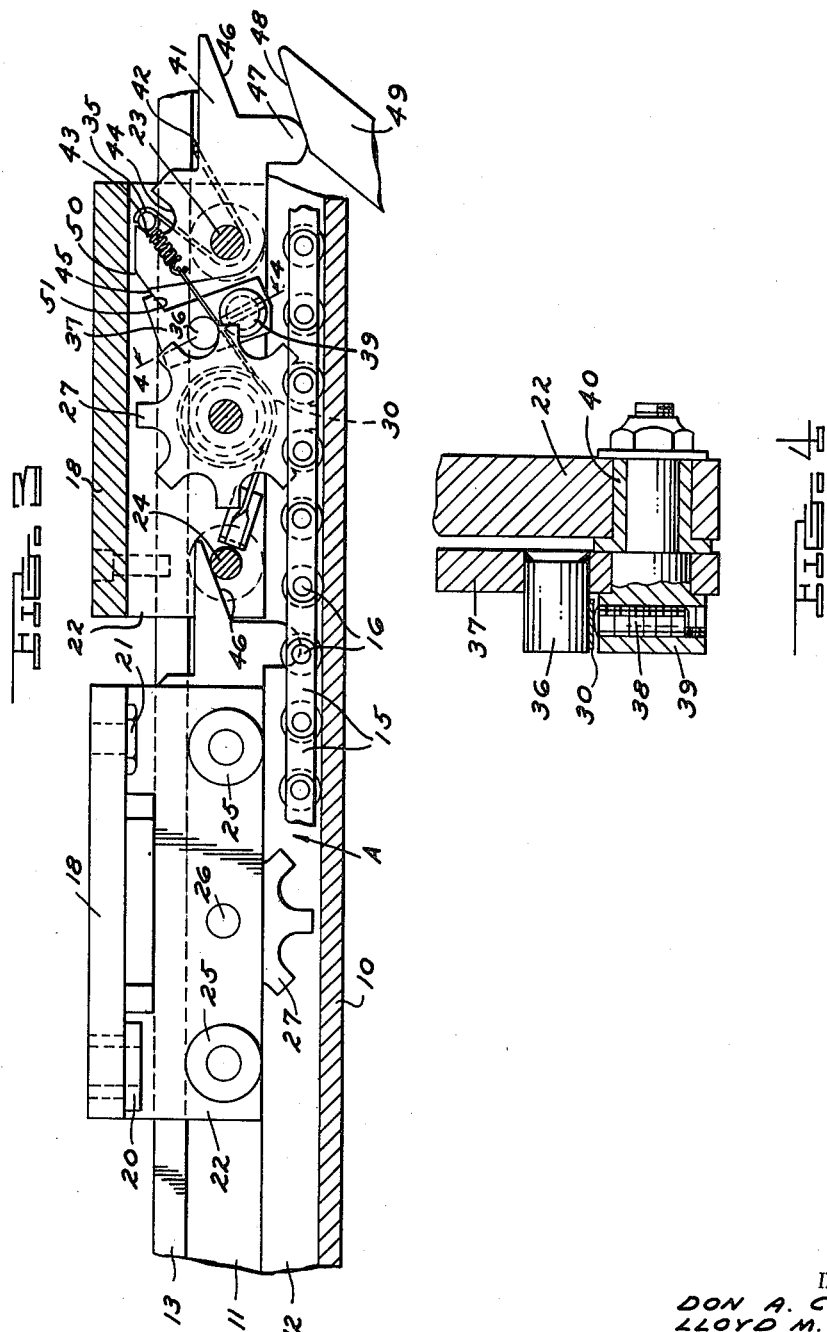

Dec. 15, 1964 D. A. CARGILL ETAL 3,161,145
SPRING CLUTCH FOR CONVEYOR PALLET
Filed Jan. 14, 1963 5 Sheets-Sheet 3

INVENTORS
DON A. CARGILL
LLOYD M. FORSTER
BY
Harley Forster & Harley

ATTORNEYS

Dec. 15, 1964   D. A. CARGILL ETAL   3,161,145
SPRING CLUTCH FOR CONVEYOR PALLET
Filed Jan. 14, 1963   5 Sheets-Sheet 5

INVENTORS
DON A. CARGILL
LLOYD M. FORSTER
BY Harley Forster & Harley
ATTORNEYS

United States Patent Office 3,161,145
Patented Dec. 15, 1964

3,161,145
SPRING CLUTCH FOR CONVEYOR PALLET
Don A. Cargill, 822 Fairfax, Birmingham, Mich., and Lloyd M. Forster, 1624 Lochridge Road, Bloomfield Hills, Mich.
Filed Jan. 14, 1963, Ser. No. 251,229
20 Claims. (Cl. 104—172)

This invention relates to a pallet construction for use in a manufacturing system of the type disclosed in co-pending application Serial No. 91,819, filed on February 27, 1961, now Patent No. 3,088,197, wherein individual workpiece fixturized pallets are clutched and de-clutched from a continuously moving conveyor drive as in overtaking a preceding pallet or in reaching an automatic or manual work station requiring the pallet to stop. In the present construction a sprocket rotatably mounted on the underside of the pallet engages a continuously running roller conveyor chain, the sprocket running free when the pallet is stationary. A spring steel band or tape helically wound on a hub connected to the sprocket has its rear end anchored to the pallet and its leading end spring-tensioned to produce clutch engagement between the tape and hub stopping rotation of the sprocket to engage pallet drive. A clutch control arm operates to free the tension on the band around the hub thereby releasing the clutch of one pallet upon overtaking another or reaching a manual or automatic work station stop in the path of such arm. Upon movement of the preceding pallet, or retraction of the manual or automatic stop, re-tensioning of the leading end of the clutch spring stops rotation of the sprocket hub causing the roller chain to re-engage drive of the pallet. Several wraps of the steel band around the hub permits a relatively light spring tension to control a substantial clutch engagement torque while a resilient pre-loaded anchor spring effectively limits the clutch application torque to provide any desired gradual rather than shock engagement, as well as to provide a safety limit on the pressure that can develop between adjacent pallets as in the case of an operator's hand inserted between stationary and approaching pallets.

In order to provide a cushioned shock absorbing feature, a similarly anchored helical steel band is provided on the pivot shaft for the control arm which is adapted to pivot on overtaking a ramp surface on a preceding pallet or manual or automatic stop, the clutch spring in this case being biased to provide a desired substantial resistance to clutch release pivotal movement of the control arm while permitting a relatively small return force to move the control arm back to the clutch engaging position for the pallet drive, thereby avoiding any rebound tendency as well as any substantial drag on the preceding pallet.

The objects reflected in the above brief description of the present invention, together with other objects, may best be understood from the following description of preferred embodiments with reference to the drawings wherein:

FIGURE 3 is a side elevation of two adjacent pallet assemblies, one of them being partially sectioned to more clearly show the clutch mechanism;

FIGURE 4 is a fragmentary sectional view taken along the line 4—4 of FIG. 3;

Figure 1:
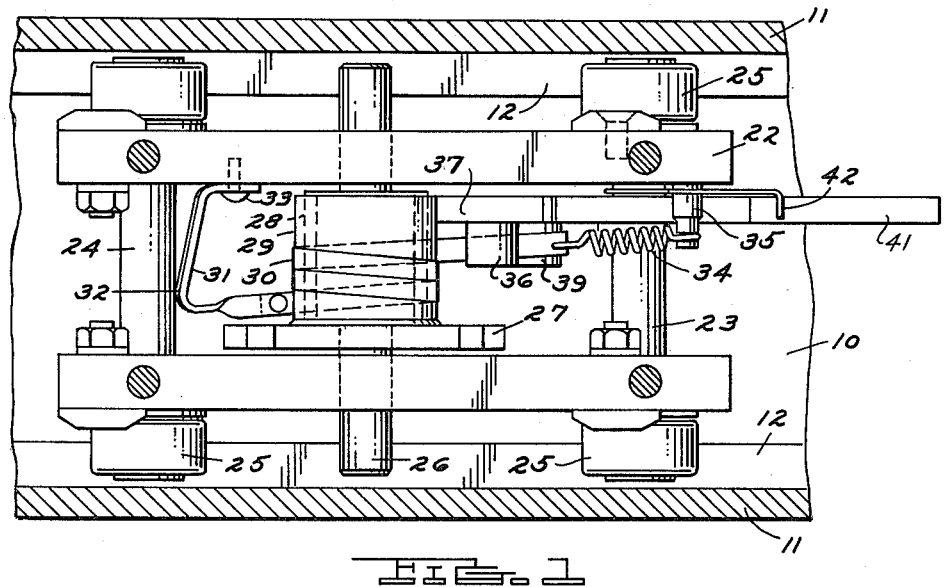
FIGURE 1 is a plan view of a pallet assembly on a conveyor track with the pallet plate and fixture omitted to show the clutch mechanism.
Figure 2:
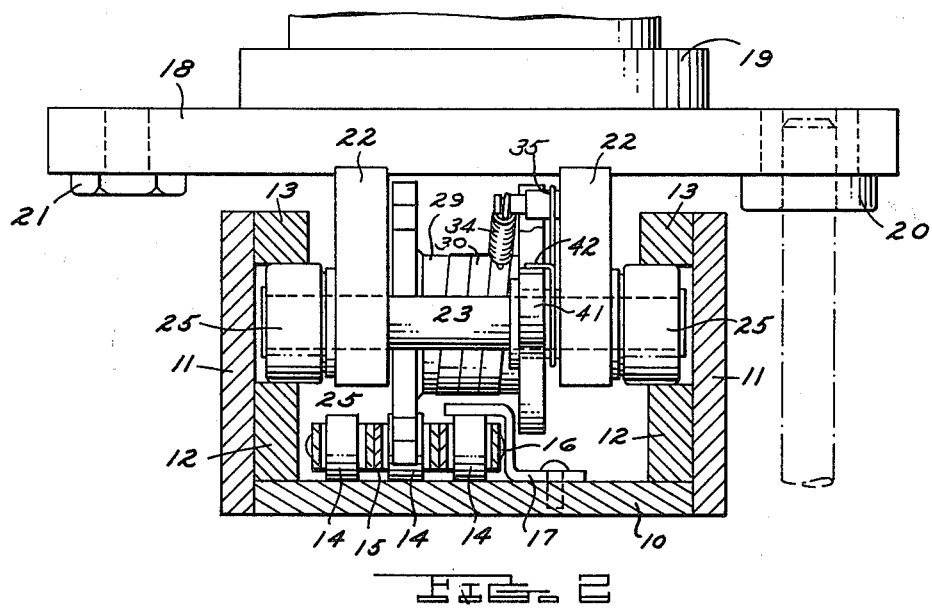
FIGURE 2 is a front-end view of such assembly including a roller chain conveyor drive.
Figure 5:
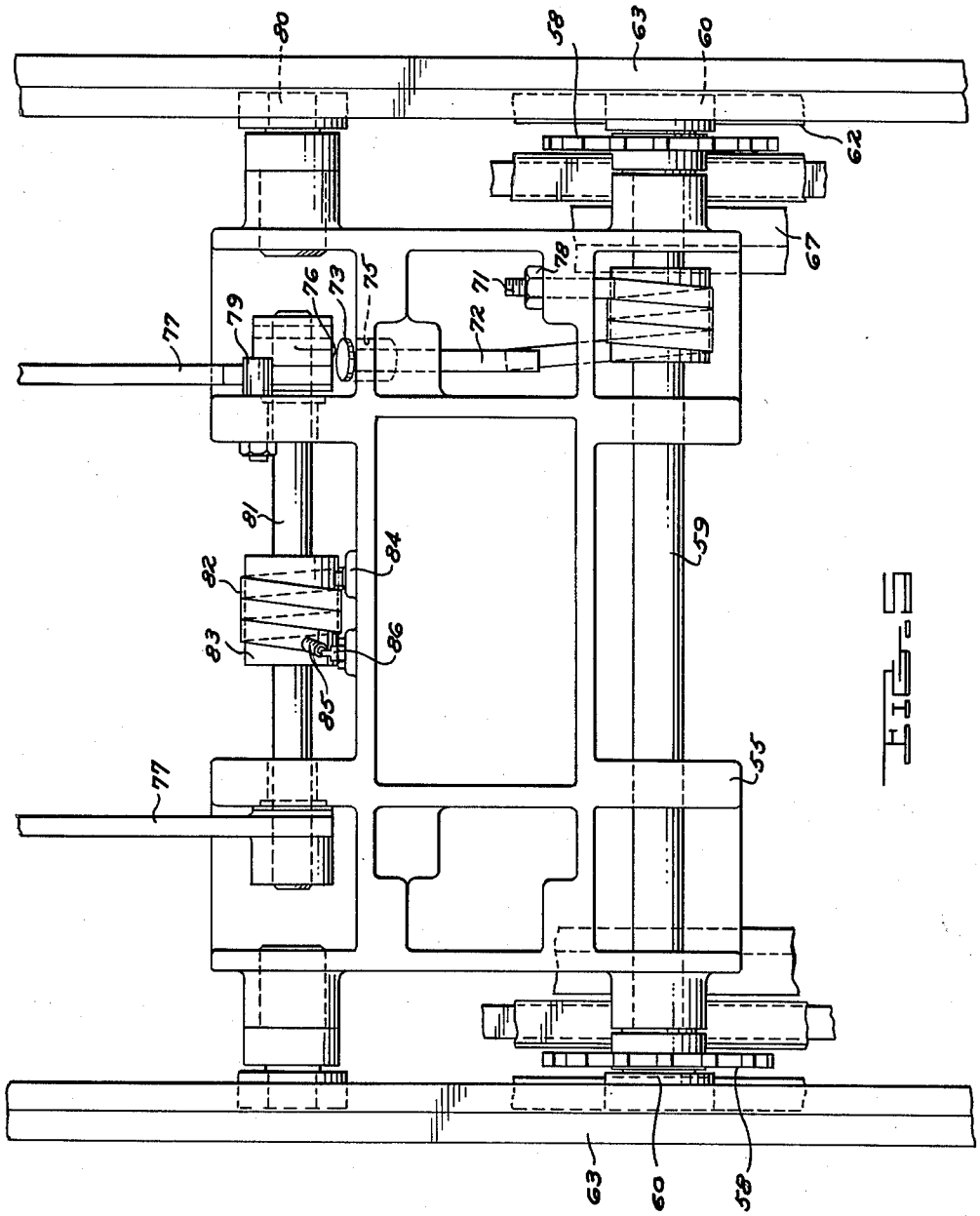
FIGURE 5 is a plan view of a modified pallet assembly construction incorporating dual sprocket drive and spring clutch shock absorber.
Figure 6:
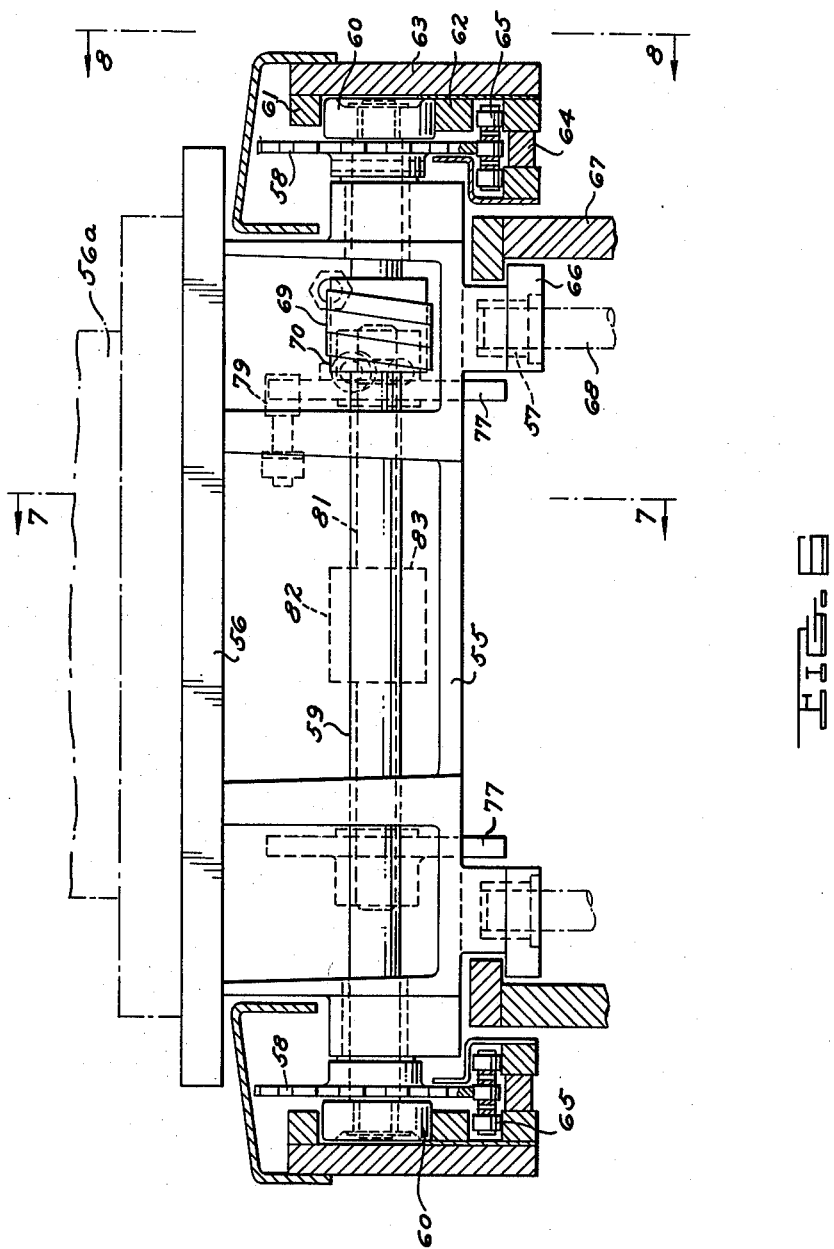
FIGURE 6 is a rear end view of such modified construction.
Figure 7:
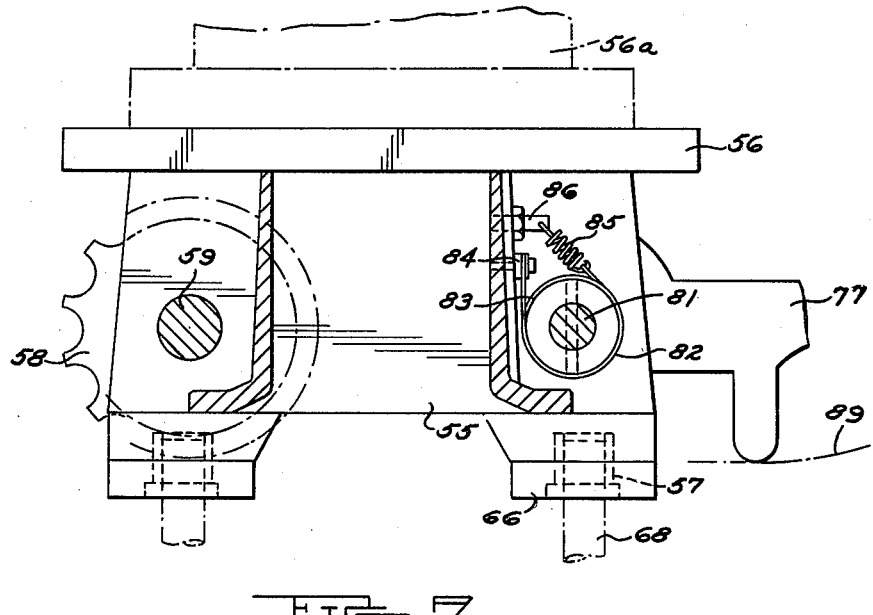
FIGURE 7 is a sectional side elevation taken along the line 7—7 of FIGURE 6.
Figure 8:
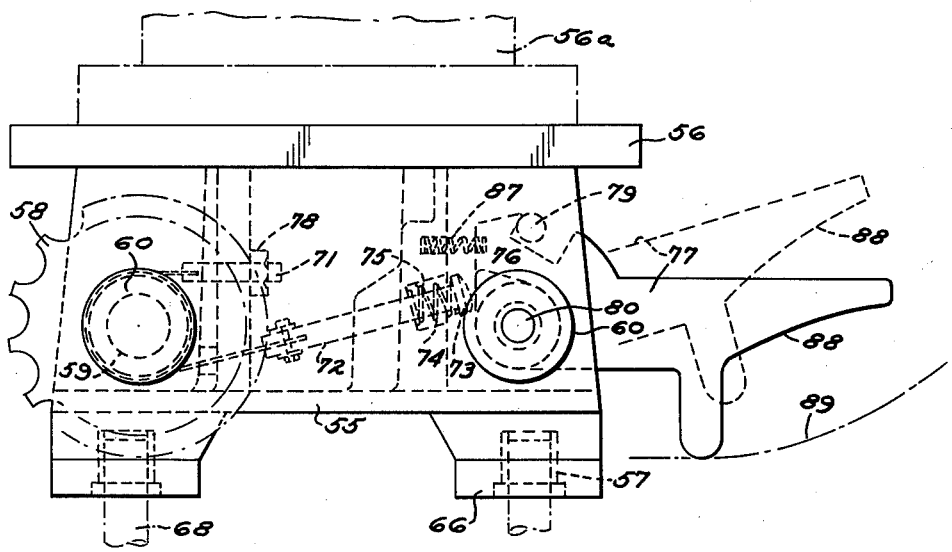
FIGURE 8 is a side elevation taken along the line 8—8 of FIGURE 6.

Referring to FIGURES 1–3 it may be seen that the general arrangement of the pallet, conveyor track and drive is similar to that shown in co-pending application, Serial No. 91,819. The conveyor track comprises a lower plate 10, side rails 11, lower wheel rails 12, and upper wheel guides 13, suitably secured together as a unitary structure. The conveyor chain A comprises triple rolls 14, connected by links 15 and connecting pins 16 and is laterally positioned between a guide rail 17 and one of the wheel rails 12. The pallet comprises a flat plate 18 mounting a workpiece fixture 19, the plate having a pair of locating bushings 20 preferably in diagonal corners and a pair of rest buttons 21 in opposite diagonal corners. A pair of vertical bars 22 rigidly secured to the underside of the plate 18 serve to mount the forward and rear axles 23 and 24 for pallet rollers 25 as well as the shaft 26 for the sprocket 27 and its hub 28.

A powdered metal oil retaining bearing 29 pressed onto the hub 28 mounts a helically wound spring steel band 30 anchored at the rear end to a leaf spring 31, pre-loaded to an appropriate value such as 30 pounds by engagement with the axle 24 at point 32 upon drawing up the anchor screw 33. The spring steel band 30 has approximately two and one-half wraps in the embodiment disclosed with the leading end projecting from the under surface where it is connected to a light actuating spring 34, anchored to a stop pin 35 seated in one of the vertical bars 22. In a typical installation the extended actuating spring may have a tension in the order of four pounds.

As best shown in FIGS. 3 and 4 the leading end of the clutch band is clamped against a pin 36 seated in a rocker arm 37 by set screw 38, seated in the rocker pivot 39 which extends through a bushing 40 in one of the bars 22. A clutch control arm 41 pivoted on the leading axle shaft 23 is biased by a spring 42 to the position shown with one wall 43 of the slot 44 in engagement with the stop pin 35. With the clutch control arm 41 in such position and the clutch tape 30 wrapped snugly on the bearing 29 and tensioned by spring 34 the rocker arm 37 is adjusted with a pre-determined clearance, e.g., in the order of .050 of an inch between adjacent corners of the rocker arm 37 and clutch control arm 41, in which position the set screw 38 is tightened. When the leading end of the clutch control arm 41 is raised as by engagement of its cam surface 46 with the axle shaft 24 of a preceding pallet or by engagement of the projection 47 with the cam surface 48 of a manual or automatic retractable stop 49, the rocker arm 37 is actuated to release the clutch band tension as soon as the clearance 45 is taken up. Further over-travel of the clutch control arm 41 within the limits of clearance provided by slot 44 merely produces relative movement between adjacent surfaces 50 and 51 on the respective control and rocker arms without unnecessary articulation of the rocker arm beyond the very slight movement to relieve tension on the clutch band providing free rotation of the sprocket 27. The pre-load in spring 42 may be calibrated in conjunction with the slope of cam surfaces 46, 48 and the weight of the assembly of pallet work fixture and workpiece to provide a desired cushioning shock absorber action for decelerating the pallet assembly during the over-travel of the control arm 41.

The operation of such shock absorbing action following clutch release may be established with a high degree of uniformity for all pallet assemblies notwithstanding substantial manufacturing tolerances in the dimensions of the various working parts by a readily accomplished uniform gauging of the clearance space 45 between control and rocker arms at the time the set screw 38 is tightened. Nevertheless there is one limitation of the shock absorber action of this arrangement which is overcome in the modified embodiment shown in FIGS. 5 to 8. Such limitation arises from the relatively constant bias of the spring 42 tending to return the control arm 41 to its normal position after the shock absorbing action is completed, thereby providing some inducement for springback of the pallet assembly.

In the modified embodiment such tendency is entirely avoided through the employment of a secondary shock absorbing clutch band adapted to provide a relatively large resistance to actuation of the control arm in a clutch release direction and a much smaller order of return torque for the control arm entirely avoiding springback tendencies.

Referring to FIGS. 5–8, the modified pallet assembly shown is for a heavier duty application than the first embodiment and employs a main pallet body casting 55 on which an upper pallet plate 56 is supported and rigidly secured and on which any suitable workpiece fixture 56a may be mounted in accurate relationship to locating bushings 57. A pair of drive sprockets 58 are secured to a common drive shaft 59 on the ends of which a pair of rollers 60 are rotatably journalled to ride between upper and lower roller tracks 61, 62 mounted on the side rail 63 of a conveyor framework, not shown, a chain track 64 also being secured to each side rail for triple roller chains 65, the center rollers of which engage sprockets 58. Lateral projections 66 in the locating bushing pads rigidly secured to the underside of the pallet body serve for the rigid clamping of the pallet assemblies relative to clamp members 67 at automatic work stations after accurate location by locating pins 68.

The clutch band 69 in this modification is wrapped on a powdered metal bearing 70, secured on the driveshaft 59, the clutch band having one end secured to an adjustable anchor screw 71 and the other end to a clutch control rod 72 each held in suitable guide apertures through the casting walls, the rod 72 having a head 73 urged forwardly by a compression spring 74 seated in a spring pocket 75. In this instance, the loading on the spring 74 in its compressed condition is relied upon to determine and limit the clutch engaging torque being designed with a suitable spring rate relative to the number of wraps of the clutch band, diameter of the bearing 70 and effective coefficient of friction which together determine the effective self-energizing multiplication of compression in the spring 74 and thereby the driving torque. The position of the head 73 relative to a control cam surface 76 on a control arm 77 is adjusted by nut 78 on the end of the anchor screw 71, preferably in close proximity as established by a thin feeler gauge so that initial travel of the arm away from stops 79 will effectively release the sprocket clutch.

Further travel of the arm 77 about the pivotal axis 80 established by rocker shaft 81 will produce a shock-absorbing clutch engagement of the clutch band 82 wrapped on a powdered metal bearing 83 rigidly secured to the rocker shaft 81, one end of the band being rigidly anchored by bolt 84 to the pallet casting while the other end is tensioned through an extension spring 85 secured to an adjustable screw 86 for determining the tension on spring 85 and thereby the effective shock-absorbing action of the band 82 in resisting the arcuate travel of arm 77. The action of the clutch band so arranged provides a very substantial resistant to the upward movement of arm 77 with a value controlled by the tension of a relatively light spring 85 while providing very little resistance to the return travel of such arm which may be accomplished either by gravity alone or aided by a very light compressive return spring 87. This minimization of return forces for the arm 77, as previously mentioned, eliminates any tendency for springback of the pallets upon stopping.

In order to produce a substantially uniform deceleration force a parabolic cam surface 88 may be provided at the leading end of the arm 77 which engages the shaft 59 of a preceding unit upon overtaking same, or similar cam surface 89 on the retractable manual or automatic work station stops, designed for a uniform rate of arm rotation and energy absorption by the clutch band 82 notwithstanding a progressively decreasing rate of linear of the travel when coming to a stop.

While two alternate embodiments of the present invention have been shown and described in detail it will be understood that numerous modifications might be resorted to without departing from the scope of the invention as defined in the following claims.

We claim:

1. In a conveyor system having a track, continuous drive means extending along said track, a plurality of pallet assemblies adapted for intermittent travel along said track through releasable drive connection with said continuous drive means, each of said pallet assemblies including a drive element rotatably mounted on said pallet adapted to engage said drive means and to be restrained from rotation to establish drive and to be released for rotation to release drive; means controllably operable to restrain and release said drive element, comprising a cylindrical member connected to said drive element, helical clutch means adapted to engage said cylindrical member, means for anchoring one end of said clutch means to said pallet assembly, and means for actuating other end of said clutch means to produce clutch engagement or disengagement of said cylindrical member, said last means including inter-engaging elements between one pallet assembly overtaking another operative to release the clutch means of the overtaking pallet assembly.

2. In a conveyor system having a track, continuous drive means extending along said track, a plurality of pallet assemblies adapted for intermittent travel along said track through releasable drive connection with said continuous drive means, each of said pallet assemblies including a drive element rotatably mounted on said pallet adapted to engage said drive means and to be restrained from rotation to establish drive and to be released for rotation to release drive; means controllably operable to restrain and release said drive element, comprising a cylindrical member connected to said drive element, helical clutch means adapted to engage said cylindrical member, means for anchoring one end of said clutch means to said pallet assembly, and means for actuating other end of said clutch means to produce clutch engagement or disengagement of said cylindrical member, said last means including a manual station along said conveyor, inter-engaging elements between a pallet assembly approaching said manual station operative to release the clutch means thereof, and manually operable means adapted to disengage said inter-engaging elements and thereby re-engage said clutch means.

3. In a conveyor system having a track, continuous drive means extending along said track, a plurality of pallet assemblies adapted for intermittent travel along said track through releasable drive connection with said continuous drive means, each of said pallet assemblies including a drive element rotatably mounted on said pallet adapted to engage said drive means and to be restrained from rotation to establish drive and to be released for rotation to release drive; means controllably operable to restrain and release said drive element, comprising a cylindrical member connected to said drive element, helical clutch means adapted to engage said cylindrical member, means for anchoring one end of said clutch means to said pallet assembly, and means for actuating the other end of said clutch means to produce clutch engagement or disengagement of said cylindrical member, said last means including a station for performing an automatic operation on a workpiece carried by a pallet assembly and inter-engaging elements between an approaching pallet assembly and said station operative to release the clutch means thereof and to re-engage said clutch means upon completion of said operation at said station.

4. The combination set forth in claim 1 wherein said helical clutch means comprises a metal tape extending around an external surface of said cylindrical member.

5. The combination set forth in claim 4 wherein said cylindrical member comprises a bearing material lubricated for uniform coefficient of friction.

6. The combination set forth in claim 4 wherein said cylindrical member comprises a powdered metal bearing material lubricated for uniform coefficient of friction.

7. The combination set forth in claim 1 wherein said means for actuating the other end of said clutch means includes an actuating spring biased to normally produce clutch engagement.

8. The combination set forth in claim 1 wherein said helical clutch means comprises a metal tape extending around an external surface of said cylindrical member, and wherein said means for actuating the other end of said clutch means includes an actuating spring biased to normally tension said tape to produce clutch engagement and a release member adjustably clamped onto said other end which may be engaged to overcome the bias of said actuating spring and relieve the tension on said metal tape to effect release of said clutch means.

9. The combination set forth in claim 1 wherein said helical clutch means comprises a metal tape extending around an external surface of said cylindrical member, and wherein said means for actuating the other end of said clutch means includes an actuating spring biased to normally tension said tape to produce clutch engagement and a release member adjustably clamped onto said other end which may be engaged to overcome the bias of said actuating spring and relieve the tension on said metal tape to effect release of said clutch means, one of said inter-engaging elements including a rocker arm mounted on said pallet assembly adapted to engage said release member.

10. The combination set forth in claim 1 wherein said helical clutch means comprises a metal tape extending around an external surface of said cylindrical member, and wherein said means for actuating the other end of said clutch means includes an actuating spring biased to normally tension said tape to produce clutch engagement and a release member adjustably clamped onto said other end which may be engaged to overcome the bias of said actuating spring and relieve the tension on said metal tape to effect release of said clutch means, one of said inter-engaging elements including a rocker arm mounted on said pallet assembly adapted to engage said release member, said release member being adjustable to a predetermined position relative to said rocker arm to insure uniformity of clutch release among the various pallet assemblies.

11. The combination set forth in claim 1 wherein said means for anchoring one end of said clutch means includes a pre-loaded resilient member adapted to limit the maximum torque applied in producing clutch engagement.

12. The combination set forth in claim 1 wherein said interengaging elements include a rocker arm shaft rotated through a substantial arc of travel between the initial and final inter-engagement of said elements when the overtaking pallet assembly comes to a stop, and shock absorber means adapted to inhibit the rotation of said shaft.

13. The combination set forth in claim 1 wherein said inter-engaging elements include a rocker arm shaft rotated through a substantial arc of travel between the initial and final inter-engagement of said elements when the overtaking pallet assembly comes to a stop, and shock absorber means adapted to inhibit the rotation of said shaft, said shock absorber means including helical clutch means having one end anchored to said pallet assembly.

14. The combination set forth in claim 1 wherein said inter-engaging elements include a rocker arm shaft rotated through a substantial arc of travel between the initial and final inter-engagement of said elements when the overtaking pallet assembly comes to a stop, and shock absorber means adapted to inhibit the rotation of said shaft, said shock absorber means including helical clutch means having one end anchored to said pallet assembly, said helical clutch means comprising a metal tape, and means for applying a limited amount of tension to the other end of said tape.

15. The combination set forth in claim 1 wherein said inter-engaging elements include a rocker arm shaft rotated through a substantial arc of travel between the initial and final inter-engagement of said elements when the overtaking pallet assembly comes to a stop, and shock absorber means adapted to inhibit the rotation of said shaft, said shock absorber means including helical clutch means having one end anchored to said pallet assembly, said helical clutch means comprising a metal tape, and means for applying a limited amount of tension to the other end of said tape, said last means being adjustable to provide a variable degree of shock absorber action to match the load and speed conditions of said conveyor.

16. The combination set forth in claim 1 wherein said inter-engaging elements include a rocker arm shaft rotated through a substantial arc of travel between the initial and final inter-engagement of said elements when the overtaking pallet assembly comes to a stop, and shock absorber means adapted to inhibit the rotation of said shaft, said shock absorber means including helical clutch means having one end anchored to said pallet assembly, said helical clutch means comprising a metal tape, and means for applying a limited amount of tension to the other end of said tape, said last means being adjustable to provide a variable degree of shock absorber action to match the load and speed conditions of said conveyor, and cam means for providing a substantially uniform rate of rocker arm shaft rotation throughout the deceleration of said pallet assembly.

17. The combination as set forth in claim 1 wherein said drive element comprises a transverse shaft having laterally spaced sprocket members fixed thereon.

18. The combination as set forth in claim 1 wherein said drive element comprises a transverse shaft having laterally spaced sprocket members fixed thereon, and wherein said continuous drive means comprises a pair of roller chains adapted to engage said sprockets.

19. The combination set forth in claim 1 wherein said means for actuating the other end of said clutch means includes a tension member connected to said other end, and a compression spring adapted to normally bias said tension member to a clutch engaging position.

20. The combination set forth in claim 1 wherein said means for actuating the other end of said clutch means includes a tension member connected to said other end, and a compression spring adapted to normally bias said tension member to a clutch engaging position, said means for anchoring one end of said clutch means including adjustable means for varying the position of said tension member.

References Cited in the file of this patent
UNITED STATES PATENTS

| | | |
|---|---|---|
| 3,088,197 | Cargill | May 7, 1963 |
| 3,091,191 | Fur | May 28, 1963 |